(12) United States Patent
Takahashi et al.

(10) Patent No.: US 6,189,643 B1
(45) Date of Patent: Feb. 20, 2001

(54) DIFFERENTIAL LIMITING CONTROL APPARATUS FOR FOUR WHEEL DRIVE VEHICLE

(75) Inventors: Akira Takahashi; Yutaka Hiwatashi, both of Tokyo (JP)

(73) Assignee: Fuji Jukogyo Kabushiki Kaisha, Tokyo (JP)

(*) Notice: Under 35 U.S.C. 154(b), the term of this patent shall be extended for 0 days.

(21) Appl. No.: 09/174,553

(22) Filed: Oct. 19, 1998

(30) Foreign Application Priority Data

Oct. 24, 1997 (JP) .................................................. 9-292693

(51) Int. Cl.$^7$ ........................ B60K 17/344; B60K 17/35; G06F 7/00; G06F 17/00
(52) U.S. Cl. ............................ 180/248; 180/249; 701/88; 701/89
(58) Field of Search .................................. 180/248, 249, 180/250; 701/88, 89

(56) References Cited

U.S. PATENT DOCUMENTS

| | | |
|---|---|---|
| 4,770,266 | 9/1988 | Yamaguchi et al. . |
| 5,172,959 | * 12/1992 | Eickhoff et al. ...................... 180/248 |
| 5,289,895 | * 3/1994 | Takata et al. .......................... 180/248 |
| 5,737,714 | * 4/1998 | Matsuno et al. ...................... 180/248 |
| 6,001,041 | * 12/1999 | Sawase et al. ........................ 180/248 |

FOREIGN PATENT DOCUMENTS

| | | |
|---|---|---|
| 6-88504 | 2/1987 | (JP) . |
| 62-43355 | 2/1987 | (JP) . |

* cited by examiner

Primary Examiner—Brian L. Johnson
Assistant Examiner—Matthew Luby
(74) Attorney, Agent, or Firm—Smith Gambrell & Russell, LLP

(57) ABSTRACT

When an accelerator pedal is released, or when a brake pedal is depressed and if braking force is lower than a reference braking force corresponding to a braking force immediately before causing a wheel lock, differential limiting force of a center differential is set to a predetermined value so as to retain an under-steer condition while engine brake is applied. When the brake pedal is depressed and if braking force is higher than the reference braking force, differential limiting force of the center differential is set to zero so as to assist an anti-lock brake system. Further, the reference braking force can be determined according to a road friction coefficient, a grade of road, a lateral acceleration and the like. Further, the predetermined value of the differential limiting force may be a constant value or may be a value corresponding to a front-to-rear weight distribution ratio.

48 Claims, 14 Drawing Sheets

DIFFERENTIAL LIMITING CONTROL APPARATUS FOR FOUR WHEEL DRIVE VEHICLE

BACKGROUND OF THE INVENTION

1. Field of the Invention

The present invention relates to a differential limiting control apparatus for a four wheel drive vehicle. More specifically, the invention relates to a technology capable of controlling differential limiting force of a center the differential according to road and vehicle running conditions.

2. Description of Prior Arts

In recent years, many vehicles including four wheel drive vehicles are equipped with an anti-lock brake control system (hereinafter, referred to as ABS) to prevent sustained wheel-locking by controlling braking force on braking.

Generally, the ABS is constituted so as to control braking force by detecting wheel slippage on braking. In applying this system to four wheel drive vehicles, sophisticated control techniques are needed due to the relationship of driving force distributed between front and rear wheels.

For example, Unexamined Japanese Patent Application No. Toku-Kai-Shou 62-43355 discloses a technique in which the differential limiting of a center differential is released when depressing a brake pedal to operate the ABS.

According to the aforesaid technique, however, since the engagement of driving force between front and rear wheels is released even in case of depressing the brake pedal lightly, especially when the brake pedal is depressed repeatedly, frequent engagement and disengagement between front and rear wheels are performed and as a result a driver feels awkwardness due to the frequent changes of driving performance of the vehicle.

That is to say, the braking force applied equally to four wheels is suddenly applied more to front or rear wheels and as a result the under-steer characteristic of the vehicle becomes too strong or inversely it becomes too weak.

To solve such a problem, Examined Japanese Patent Application No. Toku-Kou-Hei 6-88504 proposes a technique wherein the differential limiting is released when a rotational deceleration of wheels exceeds a specified value on braking and after that the ABS is operated if the ABS operational condition is satisfied, so as to start the ABS control only when the wheels come closer to a locking state.

This technique still has a problem that when the rotational deceleration of wheels becomes large, the abrupt release of the differential limiting causes a sudden slip on the front or rear wheels and as a result the driver may feel a large change in the under-steer characteristic of the vehicle for an instant before the ABS control starts.

Further, for example, when an emergency braking is applied to the vehicle on a pavement having a high road friction coefficient, the wheel rotation is largely decelerated without causing slip. In this moment, since the engagement between front and rear wheels is abruptly released while a strong braking force is retained, a shock or an impact noise may be generated from the drive train of the vehicle in the moment the engagement is released.

SUMMARY OF THE INVENTION

In view of the aforesaid disadvantages of the prior arts, it is an object of the present invention to provide a differential limiting control apparatus capable of preventing an excess under-steer or over-steer characteristic due to engine brake exerted only to the front or rear wheels when the vehicle travels on a slippery road surface, like a snowy road, with the accelerator off. It is another object of the present invention to provide a differential limiting control apparatus capable of preventing a shock in the drive train of the vehicle due a sudden release of the engagement between front and rear wheels when an emergency braking is applied on a road surface with a high friction coefficient.

In order to achieve those objects, the differential limiting apparatus according to a first aspect of the present invention comprises: differential limiting force establishing means for establishing a differential limiting force of a center differential to be a specified value when the brake pedal is not depressed with the accelerator pedal released, or when the brake pedal is depressed with the accelerator pedal released, and when the braking force is smaller than a reference braking force; differential limiting force releasing means for releasing the differential limiting force of the center differential when the braking force is larger than the predetermined reference braking force; and differential limiting force correcting means for correcting the differential limiting force established in the differential limiting force establishing means to a first value close to zero when an anti-lock brake control apparatus starts to operate.

The differential limiting control apparatus according to a second aspect of the present invention comprises: differential limiting force calculating means, for calculating such a second value of differential limiting force of said center differential as distributing an engine braking force between front and rear wheels, at a distribution ratio corresponding to a front-to-rear wheel weight distribution ratio, when the brake pedal is not depressed with the accelerator pedal released, or when the brake pedal is depressed with the accelerator pedal released, and when braking force is smaller than a reference braking force; differential limiting force establishing means for establishing the second value as a differential limiting force of the center differential after the second value is calculated, so as to distribute the engine braking force between front and rear wheels at the distribution ratio corresponding to the front-to-rear wheel weight distribution ratio; differential limiting force releasing means for releasing the differential limiting force of the center differential when the braking force is larger than the predetermined reference braking force; and differential limiting force correcting means for correcting the differential limiting force established in the differential limiting force establishing means to a first value close to zero when the anti-lock brake control apparatus starts to operate.

The differential limiting control apparatus according to a third aspect of the present invention comprises: differential limiting force calculating means for calculating such a second value of differential limiting force of the center differential as distributing the engine braking force between front and rear wheels at the distribution ratio corresponding to the front-to-rear wheel weight distribution ratio when the brake pedal is not depressed with the accelerator pedal released, or when the brake pedal is depressed with the accelerator pedal released, and when braking force is smaller than a reference braking force; differential limiting force establishing means for establishing the second value as a differential limiting force of the center differential after the second value is calculated, when wheel rotation deceleration is smaller than a predetermined reference wheel rotation deceleration, so as to distribute the engine braking force between front and rear wheels at the distribution ratio corresponding to the front-to-rear wheel weight distribution ratio, and for correcting the differential limiting force calculated in the differential limiting force calculating means of the center differential to a third value smaller than the second value after the second value is calculated, when wheel rotational deceleration is larger than the predetermined reference wheel rotational deceleration so as to release the differential limiting force of the center differential even when braking force is small; differential limiting force releasing means for releasing the differential limiting force of the center differential when braking force is larger than the predetermined reference braking force; and differential limiting force correcting means for correcting the differential limiting force established in the differential limiting force establishing means to a first value close to zero when the anti-lock brake control apparatus starts to operate.

DESCRIPTION OF THE DRAWINGS

By way of example only, embodiments of the present invention will now be described, with reference to the accompanying drawings, in which.

DETAILED DESCRIPTION OF THE INVENTION

Figure 1:
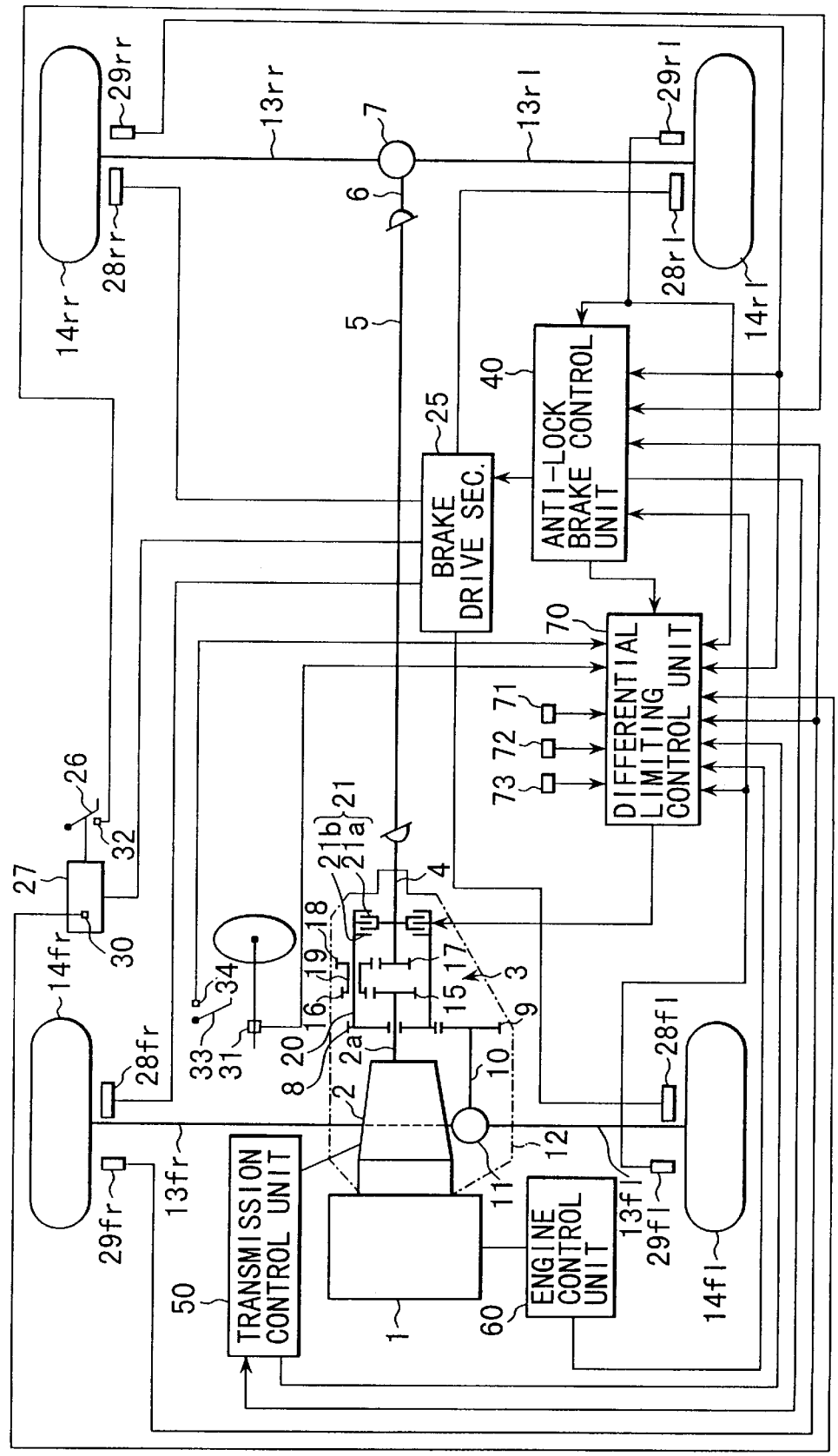
FIG. 1 is a schematic skeleton diagram showing an overall drive train of a four wheel drive vehicle employing a differential limiting apparatus set forth in a first embodiment of the present invention.

Referring now to FIG. 1, numeral 1 denotes an engine arranged in the front of a vehicle. A driving force derived from the engine 1 is transmitted from an automatic transmission 2 disposed behind the engine 1 to a center differential 3 through a transmission output shaft 2a, and a part of the driving force is transmitted from this center differential 3 to a rear final reduction gear unit 7 through a rear drive shaft 4, a propeller shaft 5 and a drive pinion shaft 6. The rest of the driving force is transmitted to a front final reduction gear unit 11 through a transfer drive gear 8, a transfer driven gear 9 and a front drive shaft 10. In this embodiment, the automatic transmission 2, the center differential 3, the front final reduction gear unit 11 and the like are integrally accommodated in a housing 12.

The driving force inputted to the rear final reduction gear unit 7 is transmitted to a left rear wheel 14rl and a right rear wheel 14rr through a left rear drive shaft 13rl and a right rear drive shaft 13rr, respectively. Further, the driving force inputted to the front final reduction gear unit 11 is transmitted to a left front wheel 14fl and a right front wheel 14fr through a left front drive shaft 13fl and a right front drive shaft 13fr, respectively.

The center differential 3 includes a first sun gear 15, having a relatively large diameter, connected to the transmission output shaft 2a, and a first pinion 16, having a relatively small diameter, meshing with the first sun gear 15. Thus a first gear set is formed.

Further, the center differential 3 includes a second sun gear 17, having a relatively small diameter, connected to the rear drive shaft 4, and a second pinion 18, having a relatively large diameter, meshing with the second sun gear 17. Thus a second gear set is formed.

Further, the first pinion 16 and the second pinion 18 are integrally formed with a pinion member 19, and a plurality of the pinion members (for example 3 pinion members) 19 are rotatably supported by a fixed shaft provided on a carrier 20.

The carrier 20 is at the front end thereof, with the transfer drive gear 8, so as to output the driving force to the front wheels.

Further, the transmission output shaft 2a is rotatably inserted into the carrier 20 from the front, while the rear drive shaft 4 is rotatably inserted thereinto from the rear. In an inner mid space formed by the carrier 20, there are provided with the first gear set composed of the first sun gear 15 and the first pinion 16, and the second gear set composed of the second sun gear 17 and the second pinion 18.

The thus constituted center differential 3 receives the driving force from the transmission output shaft 2a and transmits to the rear drive shaft 4 through the first sun gear 15, the first pinion 16, the second pinion 18 and the second sun gear 17. On the other hand, the driving force is transmitted to the transfer driven gear 9 through the carrier 20 and the transfer drive gear 8. Thus, the center differential 3 constitutes a compound type planetary gear without ring gear.

In order for this type of planetary gear assembly to have differentiation, it is necessary to properly establish the number of teeth of the first and second sun gears 15, 17, and that of the first and second pinions 16, 18, arranged around those sun gears.

Further, since the torque distribution between the front and rear wheels is varied depending upon the intermeshing pitch radius, the proper establishment of the intermeshing radii of those sun gears 15, 17 and pinions 16, 18 provides a reference torque distribution, as required, between the front and rear wheels. That is, it is possible to distribute a larger torque to the rear wheel than to the front, if desired.

Furthermore, if a different helix angle is given to both of the two gear sets, the first sun gear 15 and the first pinion 16, the second sun gear 17 and the second pinion 18, respectively, a thrust load is generated between these two gear sets to produce a friction torque at one end of the pinion members 19. This friction torque is compounded with a separating force and tangential force between gears to produce a compound friction torque applied to the carrier 20. This compound friction torque acts as a differential limiting torque proportional to the input torque; thereby a differential limiting function can be given also to the center differential 3 itself.

Further, there is provided a hydraulically operated multiple disc clutch (hereinafter, referred to as a transfer clutch) 21 between the carrier 20 and the second sun gear 17, in order to perform driving force distribution by variably controlling the differential limiting force of the center differential 3 by means of a differential limiting control apparatus 70.

The transfer clutch 21 comprises a plurality of driven plates 21a provided on the rear drive shaft 4 side, and a plurality of drive plates 21b provided on the carrier 20 side, each of which is interleaved between two respective driven plates 21a. Further, the transfer clutch 21 is constituted so as to be operated by a hydraulic pressure supplied from a hydraulic power unit (not shown) which is electronically controlled by the differential limiting control apparatus 70.

Therefore, when the transfer clutch 21 is in a released condition, i.e., in a condition where the differential limiting force is zero, torque is distributed between the front and rear wheels according to a reference torque distribution ratio, for example 35:65 (35% distributed to front wheels and 65% distributed to rear wheels), of the center differential 3 itself. On the other hand, when the transfer clutch 21 is fully engaged, the differentiation of the center differential 3 is restricted, and torque is distributed at a specified torque distribution ratio, for example 50:50 (50% distributed to front wheels and 50% distributed to rear wheels), which is determined by the vehicle specification.

Further, the pressing force, that is, the engagement torque of the transfer clutch 21 is controlled by the differential limiting control unit 70, so as to obtain any value of torque distribution ratio between the reference torque distribution ratio, for example, 35:65, and the specified torque distribution ratio, for example, 50:50.

Numeral 25 denotes a brake drive section which is connected with a master cylinder 27 and the master cylinder 27 is connected with a brake pedal 26, which is operated by a vehicle driver. When the driver operates the brake pedal 26, the master cylinder 27 generates a brake pressure and supplies it through the brake drive section 25 to a left front wheel cylinder 28fl for the left front wheel 14fl, a right front wheel cylinder 28fr for the right front wheel 14fr, a left rear wheel cylinder 28rl for the left rear wheel 14rl and a right rear wheel cylinder 28rr for the right rear wheel 14rr, respectively, thereby braking is applied to four wheels.

The brake drive section 25 is a hydraulic unit including a hydraulic pressure source, a pressure reduction valve, a pressure intensifying valve, and the like, so as to supply the brake pressure independently to each wheel cylinder, 28fl, 28fr, 28rl and 28rr according to an input signal inputted thereto.

Respective wheels $14_{fl}$, $14_{fr}$, $14_{rl}$ and $14_{rr}$ have wheel speed sensors (left front wheel speed sensor $29_{fl}$, right front wheel speed sensor $29_{fr}$, left rear wheel speed sensor $29_{rl}$ and right rear wheel speed sensor $29_{rr}$) for detecting wheel speed.

Further, the master cylinder 27 includes a pressure sensor 30 for detecting brake pressure, and the steering wheel is equipped with a steering wheel rotation angle sensor 31 for detecting a rotation angle of the steering wheel.

Further, the brake pedal 26 has a brake pedal switch 32 for detecting an ON/OFF operation of the brake pedal 26, and an accelerator pedal 33 has an accelerator pedal switch 34 for detecting an ON/OFF operation of the accelerator pedal 33.

The vehicle has an anti-lock brake control unit 40, which is constituted by a micro-computer and peripheral circuits. The anti-lock brake control unit 40 receives signals from the wheel speed sensors $29_{fl}$, $29_{fr}$, $29_{rl}$ and $29_{rr}$ and the brake pedal switch 32, and performs a judgment of the ABS operational condition (judgment whether the deceleration of the wheel has exceeded a specified value or not, when brake is applied), the operation of the anti-lock brake, and the like.

Specifically, in the anti-lock brake control unit 40, wheel speed, acceleration, deceleration, and a pseudo calculated vehicle speed of the respective wheels, are calculated based on signals from the wheel speed sensors $29_{fl}$, $29_{fr}$, $29_{rl}$ and $29_{rr}$, and also from the brake pedal switch 32. Here, the pseudo calculated vehicle speed is a vehicle speed calculated by a specified deceleration using an initial wheel speed at the moment when it is judged that an emergency braking has been applied. Further, an oil pressure mode is selected from three oil pressure modes, i.e., a pressure increasing mode, a pressure holding mode and a pressure decreasing mode, based on the result of comparison of the pseudo calculated vehicle speed with the wheel speed, the judgment of the magnitude of the acceleration and deceleration of respective wheels, and the like. After that, a brake control signal indicative of the selected oil pressure mode is outputted to the brake drive section 25. Also, this brake control signal is sent to a transmission control unit 50 and the differential limiting control unit 70.

The transmission control unit 50 performs a shift control, a lock-up control, and a line pressure control with respect to the automatic transmission 2. Further, according to the first embodiment, the transmission control unit 50 outputs a signal indicative of a gear ratio $I_m$ to the differential limiting control unit 70.

Further, the transmission control unit 50 receives an operation signal of the anti-lock brake control unit 40 when a deceleration of the wheel exceeds a predetermined value on braking, and controls the transmission so as to shift up the gear position to a higher range in order to reduce the effect of engine brake.

Further, numeral 60 denotes an engine control unit in which miscellaneous controls such as fuel injection control, ignition timing control, air-fuel ratio control, boost control, throttle angle control, and the like, are performed with respect to the engine 1. In this embodiment, the engine control unit 60 outputs a signal indicative of the throttle opening angle $\theta_{th}$ to the differential limiting control unit 70.

The differential limiting control unit 70 receives signals indicative of wheel speeds from the respective wheel speed sensors $29_{fl}$, $29_{fr}$, $29_{rl}$, $29_{rr}$, a signal indicative of brake pressure from the pressure sensor 30 of the master cylinder 27, a signal indicative of the steering wheel rotation angle from the steering wheel rotation angle sensor 31, a signal indicative of an ON/OFF operation of the accelerator pedal 33 from the accelerator pedal switch 34, a signal indicative of the gear ratio $I_m$ from the transmission control unit 50, a signal indicative of the throttle opening angle $\theta_{th}$ from the engine control unit 60, and a signal indicative of the operation of the anti-lock brake from the anti-lock brake control unit 40. The differential limiting control unit 70 calculates the differential limiting force of the transfer clutch 21 based on these signals to make a torque distribution control on the differential 3 between 35:65 and 50:50 in terms of front-to-rear torque distribution ratio.

Specifically, when the accelerator pedal is released, in the case where no brake is applied, or where the braking force is lower than a predetermined reference braking force $F_s$ corresponding to a braking force immediately before a wheel lock is caused, the differential limiting force of the center differential 3 is established to be a predetermined differential limiting force $S_c$ and in the case where the braking force is larger than the reference braking force $F_s$, the differential limiting force of the center differential 3 is released, i.e., established to be zero.

The predetermined differential limiting force $S_c$ is established to be constant in this first embodiment of the present invention. Further, in this embodiment, the value $S_c$ is selected on the safe side in ordinal running situations and the value is, for example, 0.2 x an engine brake generated at 5,000 rpm of the engine speed at 2nd gear speed. Further, in this embodiment, with respect to the reference braking force $F_s$, a constant value representing a typical slippery road is established.

That is to say, in the case where no brake is applied with accelerator off, the differential limiting force $S_c$ restricts the differentiation of the center differential 3 in such a way that the rotational difference between front and rear wheels is suppressed in order to prevent only front or rear wheels from causing a large slip, thereby a stable under steer characteristic can be maintained.

Figure 4:
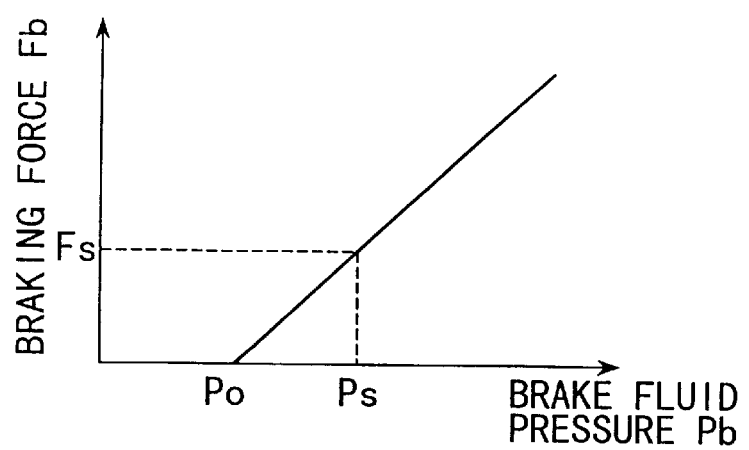
FIG. 4 is a graph showing a relationship between braking force and brake fluid pressure according to a first embodiment of the present invention.

Further, when the driver depresses the brake pedal 26 with the accelerator off, the brake pressure in the master cylinder 27 increases according to the pedal effort. The relationship between the braking force $F_b$ and the brake fluid pressure $P_b$ is given as shown in FIG. 4. When the brake pedal 26 is depressed and the brake fluid pressure $P_b$ reaches $P_o$, the braking force starts to rise. When the brake pedal 26 is further depressed, if the brake fluid pressure $P_b$ is smaller than or equal to a reference brake fluid pressure $P_s$ (brake fluid pressure corresponding to the reference braking force $F_s$), the differential limiting control is retained as it is. On the other hand, if $P_b$ becomes larger than $P_s$, which is recognized as a large braking force being applied such that a brake lock may occur on any of the four wheels, in order to enter the ABS control, the differential limiting force of the center differential 3 is released, i.e., established to be zero.

Figure 5:
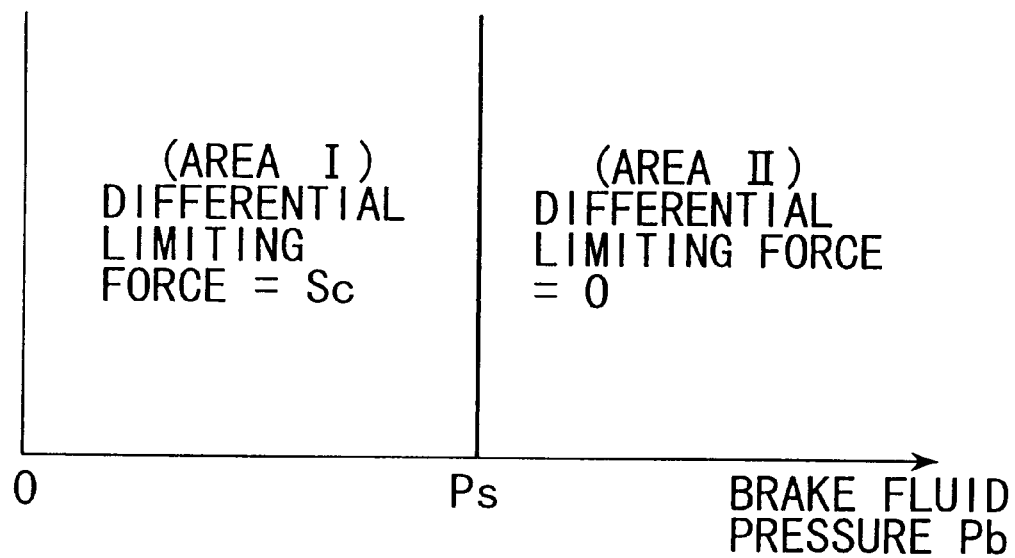
FIG. 5 is an explanatory diagram showing areas of differential limiting force to be taken with respect to brake fluid pressure according to a first embodiment of the present invention.

FIG. 5 is an explanatory diagram showing the value of the differential limiting force to be taken according to the brake fluid pressure.

When the brake is applied and the anti-lock brake control unit 40 starts to operate, the differential limiting force of the center differential 3 is established to be a specified small value which is close to zero, so as to assist the restoration from wheel lock.

Figure 3:
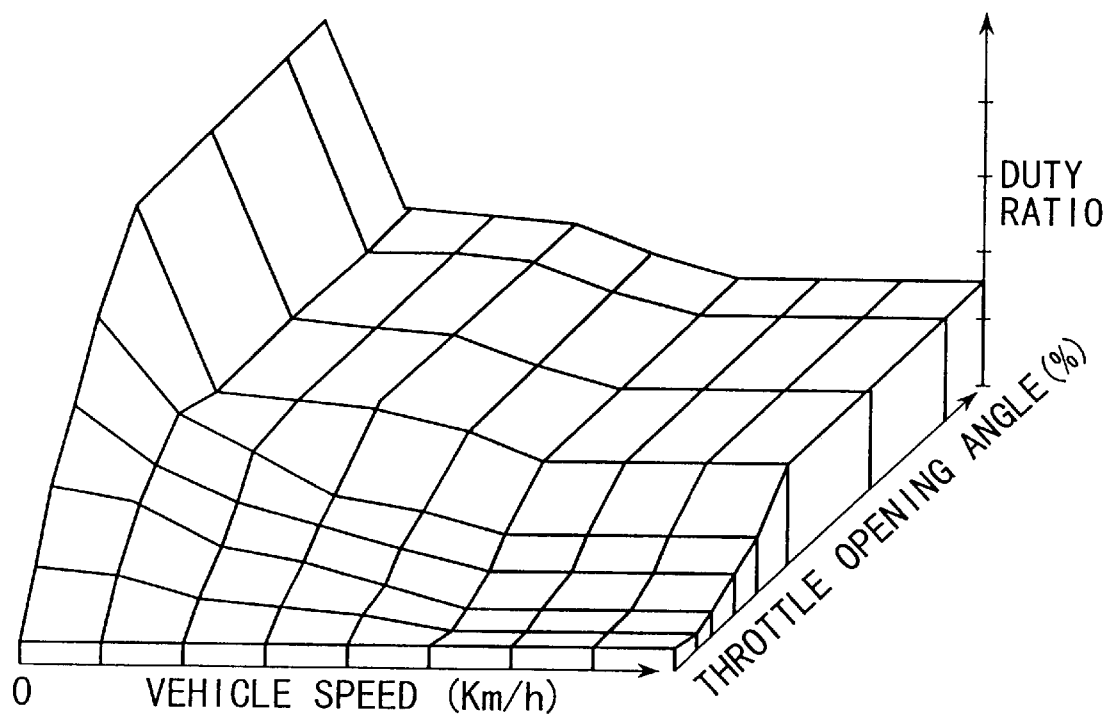
FIG. 3 is an explanatory diagram showing an example of a differential limiting torque characteristic according to a first embodiment of the present invention.

Further, in a case other than accelerator OFF, for example, the differential limiting force of the hydraulically operated transfer clutch 21 is determined as a duty ratio parameterizing a throttle opening angle $\theta_{th}$ and a vehicle speed V expressed on a three-dimensional map shown in FIG. 3. The differential limiting control comprises a normal control, a starting-up control, a steering control and a slip control.

In the normal control, one map per each gear speed is prepared. For example, in the case of a vehicle having 4 speeds, five maps including a reverse speed are prepared. As shown in an example of the map in FIG. 3, the differential limiting torque is controlled so as to become lower as the throttle opening angle $\theta_{th}$ is small and the vehicle speed V is large, so that the turning performance and fuel economy are improved.

In the starting-up control, in the case where it is judged that the vehicle speed is 0 km/h and the vehicle is directed straight, the differential limiting torque is controlled so as to be proportional to the throttle opening angle $\theta_{th}$ in order to secure a smooth and easy starting on a road surface having a low friction coefficient.

In the steering control, the differential limiting torque is controlled so as to be reduced compared to the normal control according to a rear-to-front rotation ratio NR/NF (NR: rotation number of the rear wheel, NF: rotation number of the front wheel), in order to enhance the steering feeling at a specified low speed area of the vehicle.

As for the slip control, in the case where the rear or front wheel causes a larger slip than a specified value, the differential limiting torque is controlled so as to increase in order to secure the maximum driving force, or to improve the running stability.

Figure 2:
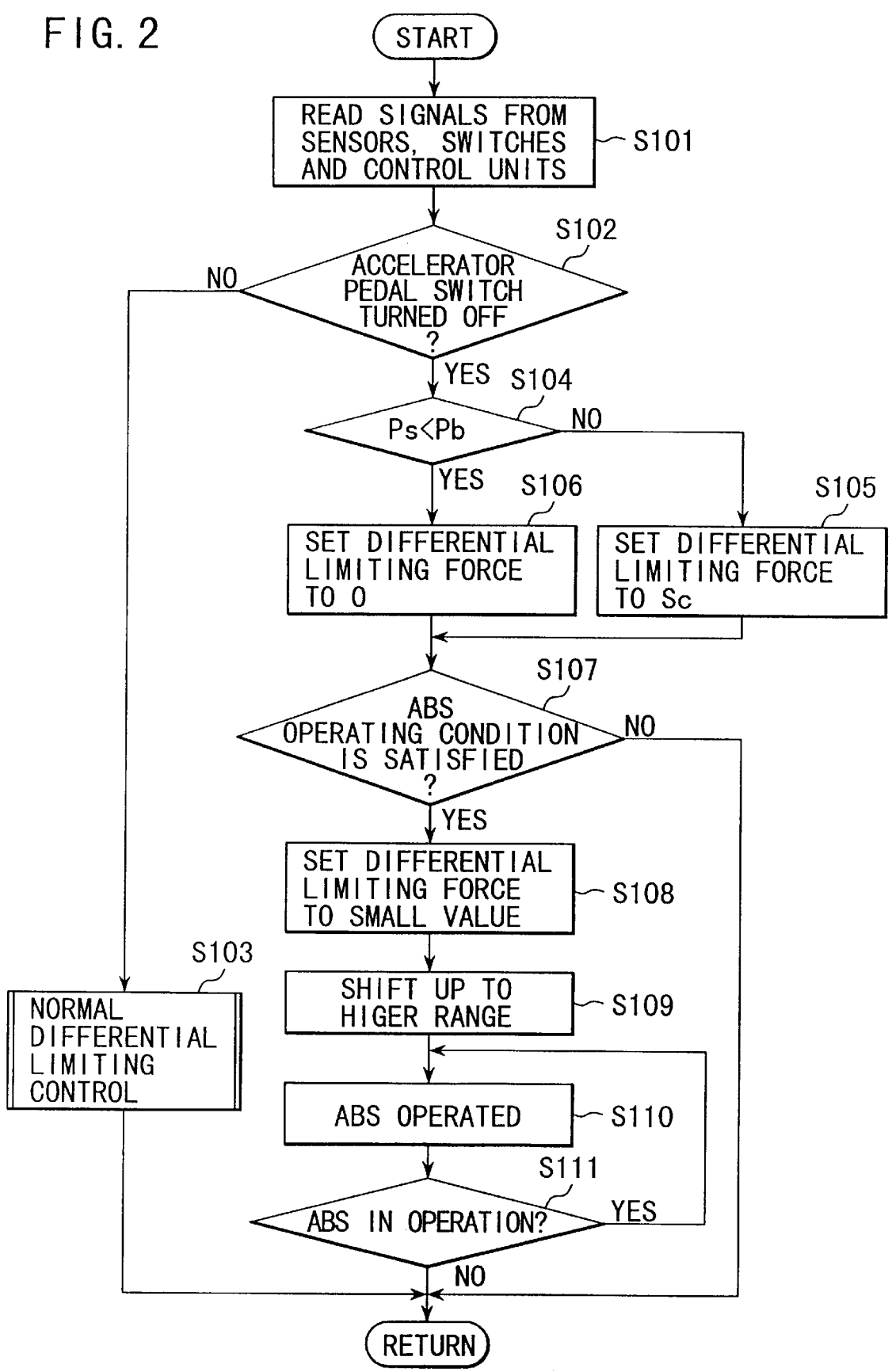
FIG. 2 is a flowchart of a differential limiting control according to a first embodiment of the present invention.

The control process in the differential limiting control unit 70 will be described with reference to the flowchart shown in FIG. 2. The control program is executed at specified times during the running of the vehicle. When the program starts, at a step (hereinafter referred to as [s]) 101, signals are read from miscellaneous sensors, switches and control units, and the program goes to S102, where the state of the accelerator pedal switch 34 is judged.

If it is judged at S102 that the accelerator pedal switch 34 is turned ON (accelerator ON), the program skips to S103 where the center differential 3 is set to the aforesaid normal control, and the program leaves the routine. On the other hand, if it is judged at S102 that the accelerator pedal switch 34 is turned OFF (accelerator OFF), the program goes to S104, where the brake fluid pressure $P_b$ is compared with the reference brake fluid pressure $P_s$ corresponding to the predetermined reference braking force $F_s$.

If it is judged at S104 that $P_b$ is equal to or smaller than $P_s$ (including the case where no brake is applied), in other words, if the braking force $F_b$ is smaller than the reference braking force $F_s$, the program goes to S105 where the differential limiting force of the center differential 3 is established to be the predetermined value $S_c$. On the other hand, in it is judged at S104 that $P_b$ is larger than $P_s$, in other words, if the braking force $F_b$ is larger than the reference braking force $F_s$, the program goes to S106, where the differential limiting force of the center differential 3 is released or established to be zero.

Then, the program goes from S105 or S106 to S107. At S107, it is judged whether or not the ABS operational condition (the deceleration of the wheel exceeds a specified value on braking) is satisfied. If it is not satisfied, the program leaves the routine, and if it is satisfied, the program goes to S108 where the differential limiting force of the center differential 3 is established to be a specified small value close to zero, so as to assist the restoration from the wheel lock. At this time, even if the differential limiting force is set to zero, it returns again to that small value.

After that, the program goes to S109 where the gear position is shifted up into a higher range than the current one and the program steps to S110 to start the ABS.

Further, the program goes to S111 where it is judged whether or not the ABS is being operated. If the ABS is being operated, the program returns to S110 to continue the operation of the ABS and if the ABS is not being operated, the program leaves the routine.

Thus, according to the first embodiment of the present invention, when the accelerator is OFF, in the case where no braking is applied, or where the braking force on braking is lower than the reference braking force $F_s$ corresponding to the braking force immediately before causing the wheel lock, the differential limiting force of the center differential 3 is set to the predetermined differential limiting force $S_c$. Thus, since the differential limiting force is set to an appropriate value, when the accelerator is released on a slippery road such as a snowy road, the vehicle can be prevented from falling into an excessive under steer characteristic, or an excessive over steer characteristic.

Further, according to the first embodiment, in the case where the braking force on braking exceeds the reference braking force $F_s$, i.e., in case where the ABS control is surely needed, since the differential limiting force is released to zero in order to detect the slip state of respective wheels independently, the power train can be prevented from causing a shock when the connection between front and rear wheels is released, even in cases where an emergency braking is applied on a road surface with a high friction coefficient.

Figure 6:
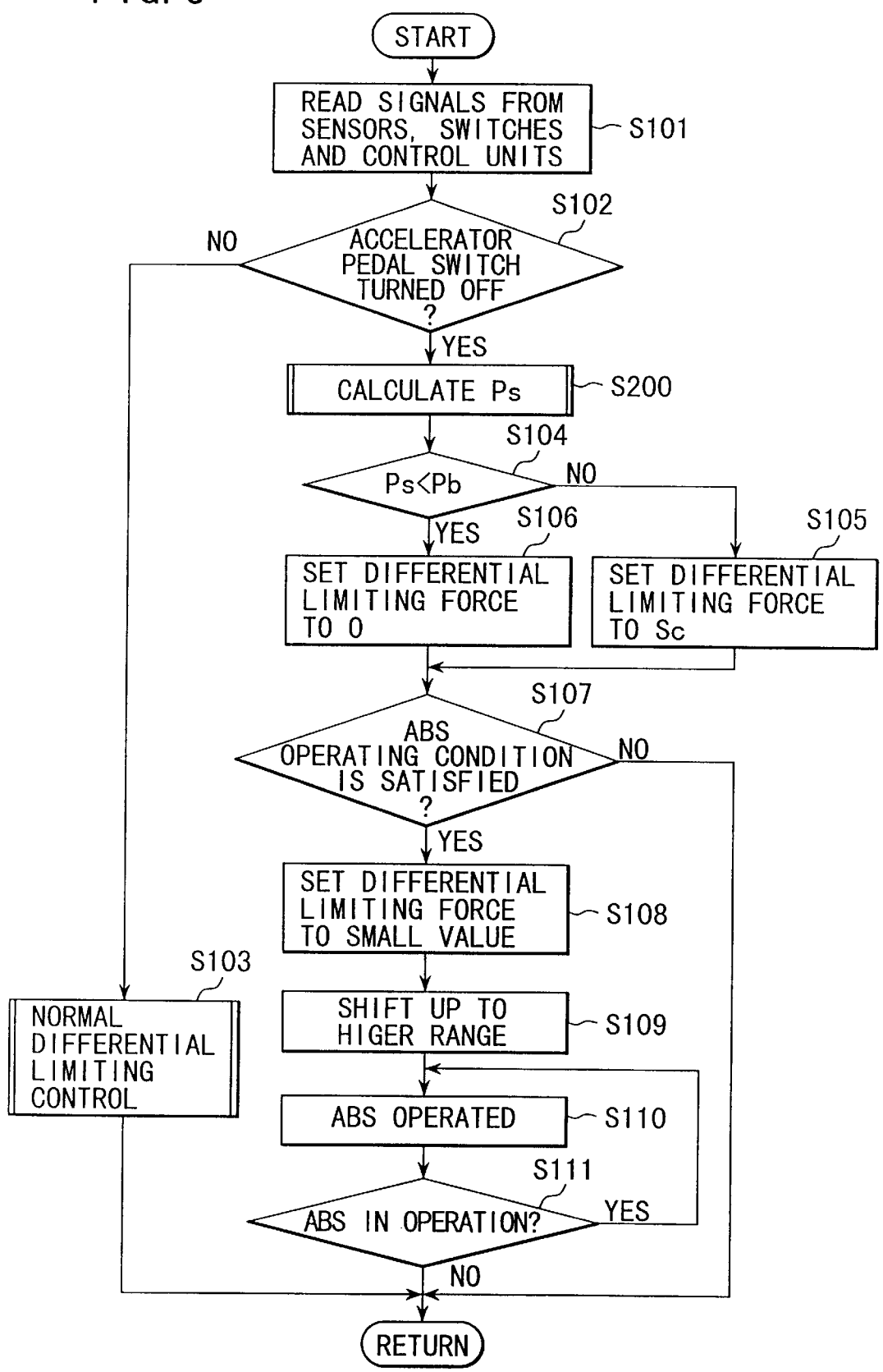
FIG. 6 is a flowchart of a differential limiting control according to a second embodiment of the present invention.
Figure 7:
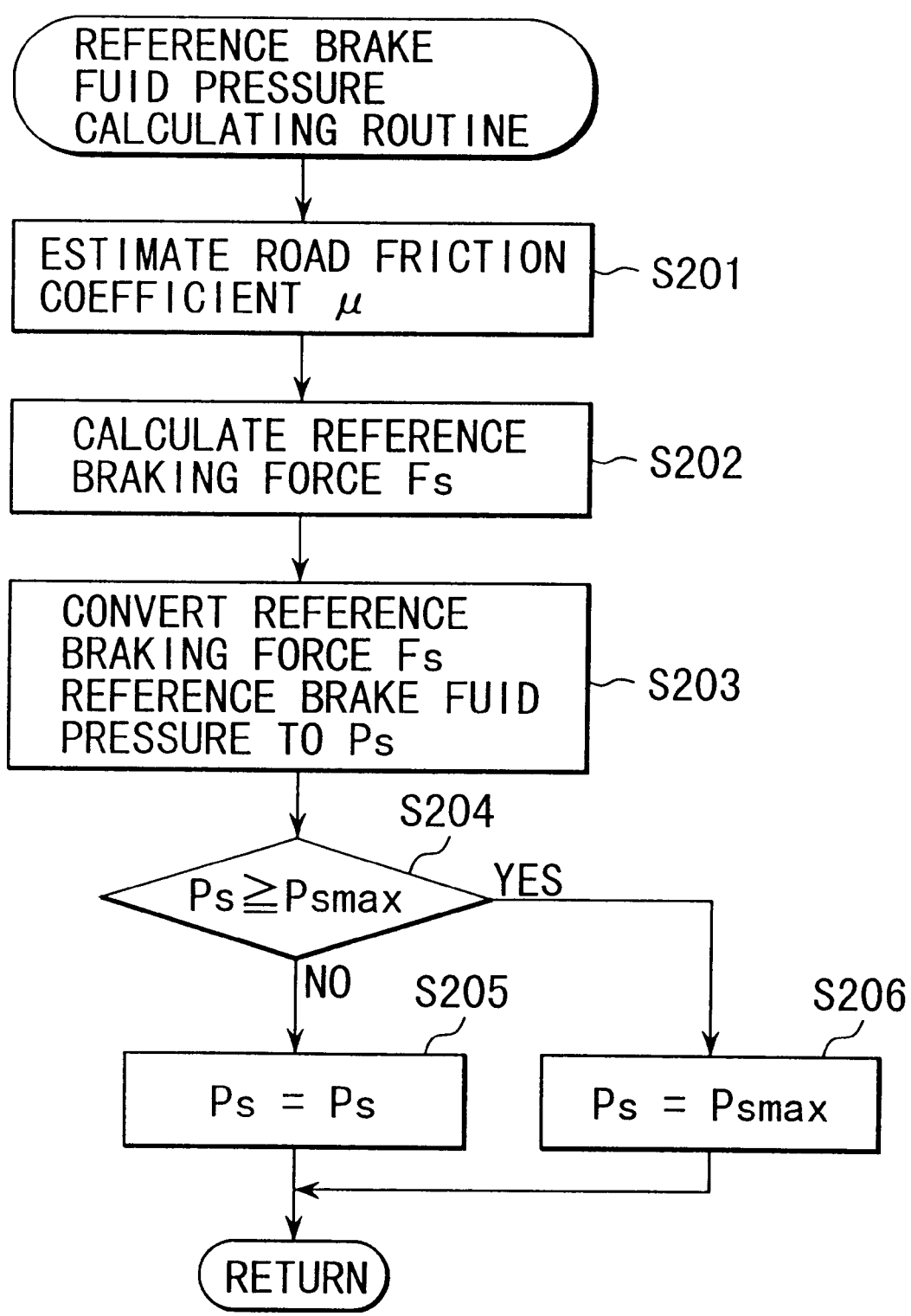
FIG. 7 is a flowchart of a routine for calculating a reference brake fluid pressure according to a second embodiment of the present invention.

FIGS. 6 and 7 show a second embodiment of the present invention. The feature of the second embodiment is to determine the reference brake fluid pressure $P_s$ according to the road friction coefficient. Other constructions and operations are identical to those of the first embodiment.

Here, the road friction coefficient referred to in the second embodiment is, for example, a road friction coefficient calculated in the road friction coefficient estimation method proposed by the inventor of the present invention in Japanese Patent Application Laid-open No. Toku-Kai-Hei 8-2274.

Briefly describing the above estimation method, the cornering power of the front and rear wheels is estimated, being extended to the non-linear region, based on the equation of motion about the lateral motion of the vehicle, and a road friction coefficient is estimated by taking the ratio of the thus estimated cornering power to the equivalent cornering power of the front and rear wheels on a road surface having a high friction coefficient.

The differential limiting control unit 70 according to the second embodiment of the present invention is additionally connected with a yaw rate sensor 71 as shown in FIG. 1. With respect to the differential limiting control according to the second embodiment, as illustrated in the flowchart of FIG. 6, when it is judged at S102 that the accelerator pedal switch 34 is turned OFF (accelerator OFF), the program goes to S200 where the reference brake fluid pressure $P_s$ is calculated according to a reference brake fluid pressure calculating routine, which will be described hereinafter, and then steps to S104 where the brake fluid pressure $P_b$ is compared with the reference brake fluid pressure $P_s$ calculated at S200. The processes after S104 are the same as those in the first embodiment.

With respect to the reference brake fluid pressure calculating routine, as shown in FIG. 7, a road friction coefficient is estimated at S201, and then the program goes to S202 where the reference braking force $F_s$ is calculated based on the road friction coefficient estimated at S201, in accordance with the following formula:

$$F_s = a_1 \cdot W \cdot \mu + b_1 \qquad (1)$$

where W is vehicle weight; $\mu$ is road friction coefficient estimated; and $a_1$, $b_1$ are correction coefficients established taking errors on estimating $\mu$ into consideration.

Then, the program goes to S203 where the reference braking force $F_s$ is converted into a reference brake fluid pressure $P_s$ with reference to a map or the like.

After that, the program goes to S204 wherein the calculated reference brake fluid pressure $P_s$ is compared with an upper limit value $P_{smax}$. The upper limit value $P_{smax}$ is established to be a level at which the shock in the drive train is endurable when an actual vehicle is tested. The value is, for example, established to be a brake fluid pressure corresponding to a braking force which generates a deceleration of 0.5 G (gravitational acceleration) or so.

As a result of the comparison at S204, if the calculated reference brake fluid pressure $P_s$ is smaller than the upper limit value $P_{smax}$, the program goes to S205 in which the reference brake fluid pressure $P_s$ is established to the calculated reference brake fluid pressure $P_s$. If the calculated reference brake fluid pressure $P_s$ is equal to or larger than the upper limit value $P_{smax}$, the program goes to S206 in which the reference brake fluid pressure $P_s$ is established to the upper limit value $P_{smax}$, and the program leaves the routine.

Thus, according to the second embodiment of the present invention, since the reference brake fluid pressure is established according to the road friction coefficient, an accurate reference brake fluid pressure can be established according to the road situation and also the timing immediately before generating a wheel-locking can be obtained with accuracy.

Further, since the reference brake fluid pressure is established within the upper limit value, the drive train shock caused when the transference of the differential limiting force suddenly disappears during running especially on a road surface with high friction coefficient such as a road surface of a dry pavement, can be avoided.

Figure 8:
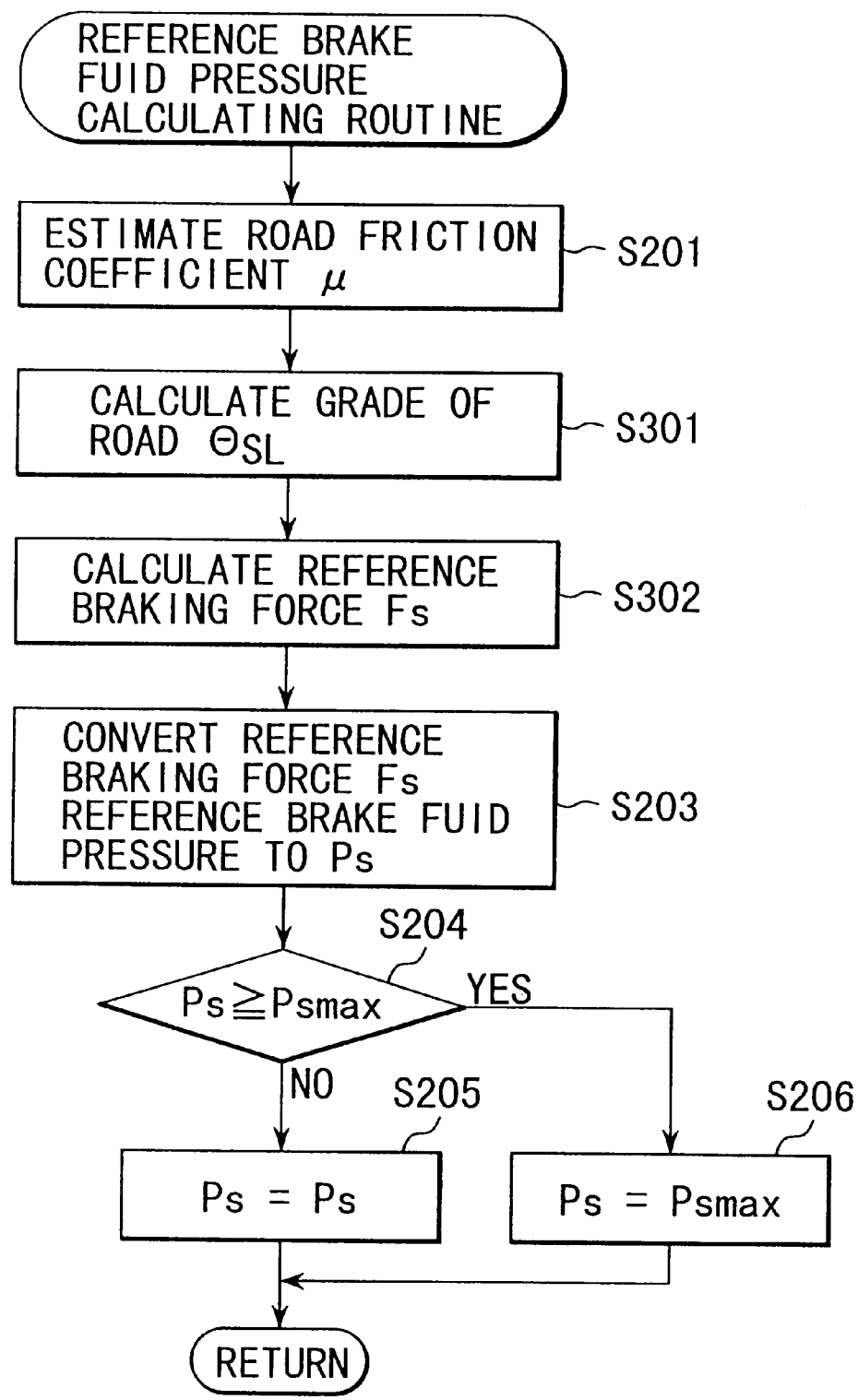
FIG. 8 is a flowchart of a routine for calculating a reference brake fluid pressure according to a third embodiment of the present invention.

FIG. 8 is a flowchart of a reference brake fluid calculating routine according to a third embodiment of the present invention. The feature of the third embodiment is to calculate the reference brake fluid pressure $P_s$, also taking the effect of the grade of the road into consideration. Other constructions and operations are identical to those of the second embodiment.

The grade $\theta_{SL}$ expressed in percent of the road is obtained for example from the following formula on the basis of longitudinal acceleration of the vehicle and the rate of change of vehicle velocity:

$$\theta_{SL} = \text{(longitudinal acceleration} - \text{rate of change of vehicle velocity}/g)/100 \qquad (2)$$

where $\theta_{SL}$ is grade of road (plus sign indicates up-grade) and g is gravitational acceleration.

Further, the grade SL expressed in tangent of the road may be calculated from the following formula:

SL=tan (sin$^{-1}$ (((engine torque·torque ratio of torque converter·gear ratio of transmission·final gear ratio/tire radius)−running resistance) / vehicle weight−rate of change of vehicle velocity)/g))·100

≅(((engine torque·torque ratio of torque converter·gear ratio of transmission·final gear ratio/tire radius)−rate of change of vehicle velocity)/g))·100 (2a)

Further, the grade of the road may be calculated from altitude data obtained from a navigation system.

The differential limiting control unit 70 according to the third embodiment of the present invention is, additionally to the second embodiment, connected with a longitudinal acceleration sensor 72 as shown in FIG. 1. With respect to the calculation of the reference brake fluid pressure according to the second embodiment, as illustrated in a flowchart of FIG. 8, first at S201 a road friction coefficient is estimated, then at S301 the grade $\theta_{SL}$ of the road is calculated. The program goes to S302 where the reference braking force $F_s$ is calculated according to the following formula containing a road friction coefficient $\mu$ and a grade $\theta_{SL}$:

$$F_s = a_2 \cdot \cos(\theta_{SL}) \cdot W \cdot \mu + b_2 \tag{3}$$

where W is vehicle weight and $a_2$, $b_2$ are predetermined correction coefficients on detecting a road friction coefficient $\mu$ and a grade $\theta_{SL}$.

The processes after S203 are the same as those in case of the second embodiment.

Thus, according to the third embodiment of the present invention, since the reference brake fluid pressure is established in accordance with the road friction coefficient $\mu$ and the grade $\theta_{SL}$ of the road, an accurate reference brake fluid pressure can be established taking the road condition and the up and down road configuration into consideration and as a result the timing immediately before the wheel lock can be accurately obtained.

Figure 9:
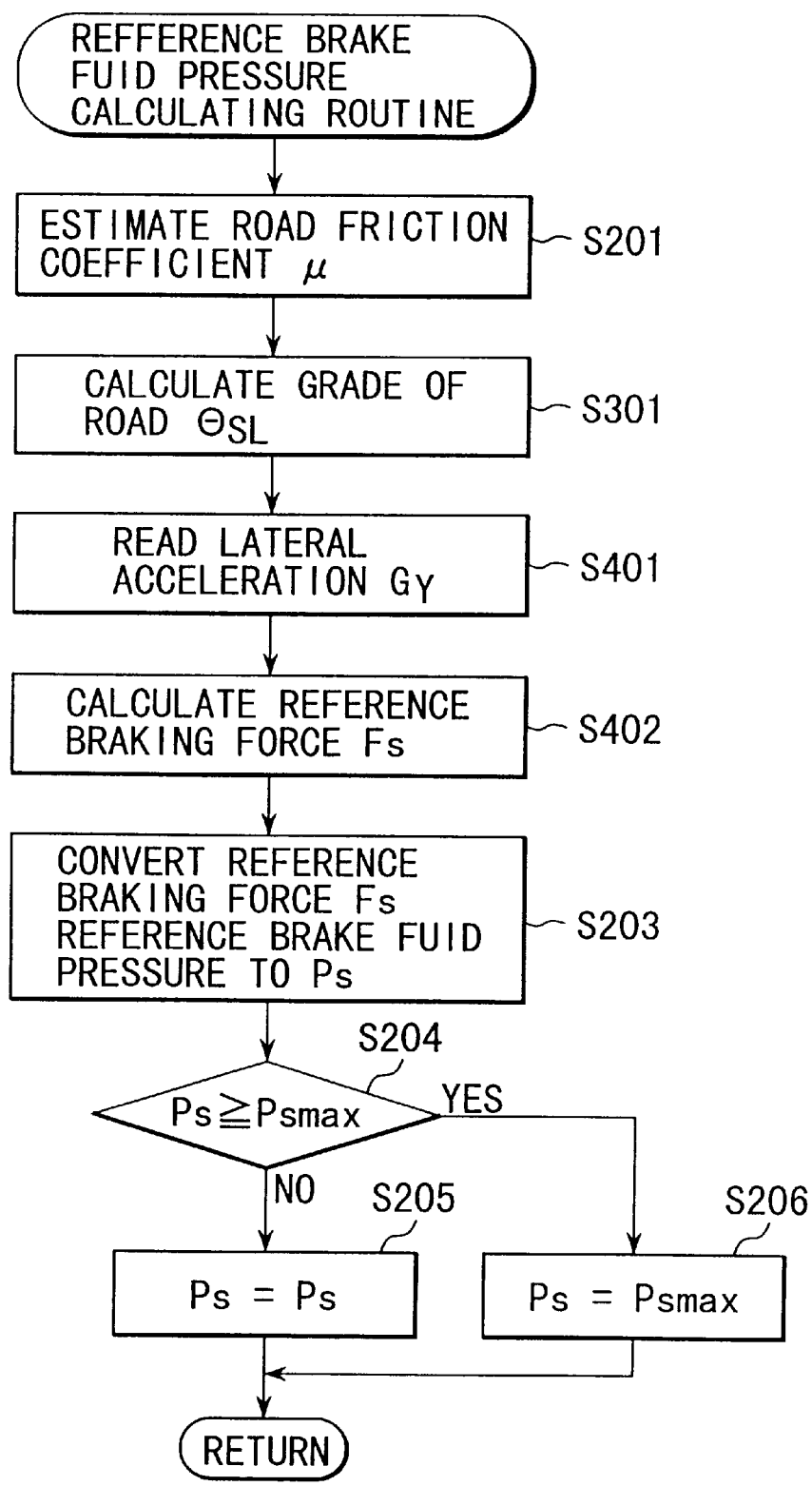
FIG. 9 is a flowchart of a routine for calculating a reference brake fluid pressure according to a fourth embodiment of the present invention.

FIG. 9 is a flowchart of a reference brake fluid calculating routine according to a fourth embodiment of the present invention. The feature of the fourth embodiment is to calculate the reference brake fluid pressure taking the effect of lateral acceleration generated when turning into consideration. Other constructions and operations are identical to those of the third embodiment.

The differential limiting control unit 70 according to the fourth embodiment of the present invention is, additionally to the third embodiment, connected with a lateral acceleration sensor 73 as shown in FIG. 1.

The lateral acceleration $G_y$ may be calculated based on an actual yaw rate $\gamma$ detected by the yaw rate sensor 71 and a vehicle speed V according to the following formula:

$$G_y = V \cdot \gamma / g \tag{4}$$

Further, the lateral acceleration $G_y$ may be derived from the following formula using a steering wheel rotation angle $\delta_f$, a steering gear ratio N, a vehicle stability factor A and a wheel base L.

$$G_y = \delta_f / N \cdot V^2 / (1 + A \cdot V^2) \cdot L / g \tag{4a}$$

Referring now to the flowchart shown in FIG. 9, first at S201 the road friction coefficient $\mu$ is estimated, and then at S301 the grade $\theta_{SL}$ of the road is calculated. The program goes to S401 where the lateral acceleration $G_y$ is read from the lateral acceleration sensor 73.

Then, the program goes to S402 where the reference braking force $F_s$ is calculated according to the following formula, using the road friction coefficient $\mu$, the grade $\theta_{SL}$ of the road and the lateral acceleration $G_y$:

$$F_s a_3 \cdot \cos(\theta_{SL}) \cdot W \cdot (\mu^2 - G_y^2)^{1/2} + b_3 \ldots \tag{5}$$

where W is vehicle weight and $a_3$, $b_3$ are correction coefficients predetermined taking errors on detecting the road friction coefficient $\mu$, the lateral acceleration the grade $\theta_{SL}$ of the road and the lateral acceleration $G_y$ into consideration.

The steps after S203 are the same as those in the third embodiments.

Thus, according to the fourth embodiment, since the reference brake fluid pressure is determined based on the road friction coefficient $\mu$, the lateral acceleration the grade $\theta_{SL}$ of the road and the lateral acceleration $G_y$, an accurate reference brake fluid pressure can be established in accordance with the road condition, the up and down road configuration and the turning condition of the vehicle, and, as a result, the timing immediately before the wheel lock can be accurately obtained.

Figure 10:
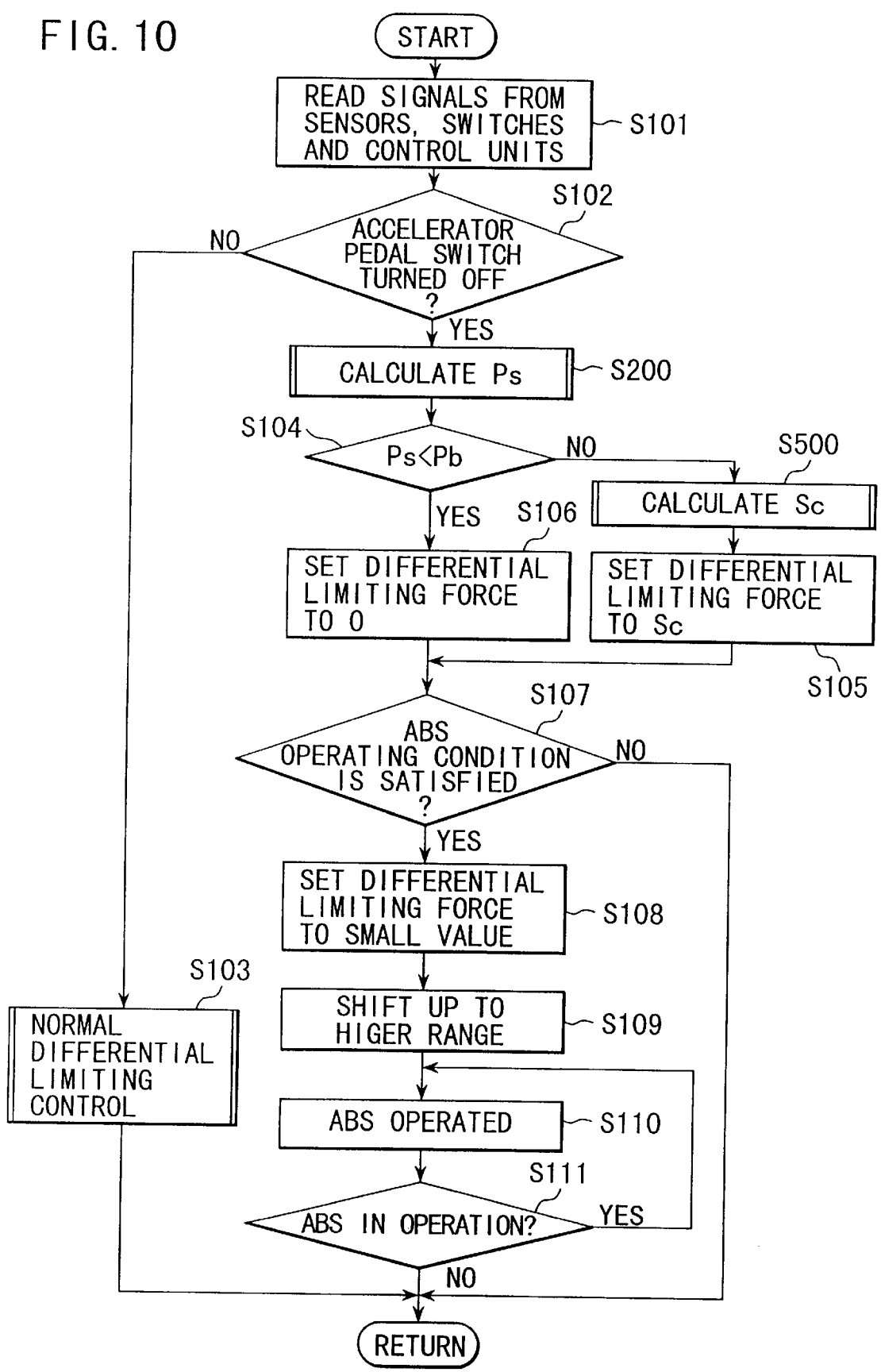
FIG. 10 is a flowchart of a differential limiting control according to a fifth embodiment of the present invention.
Figure 11:
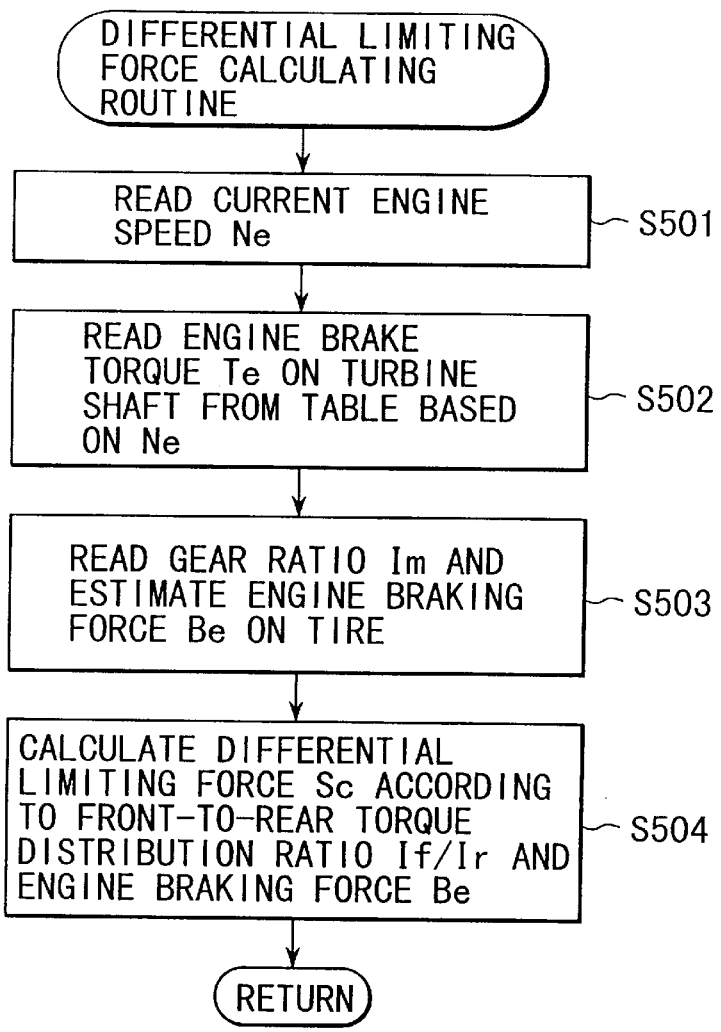
FIG. 11 is a flowchart of a routine for calculating a differential limiting force according to a fifth embodiment of the present invention.
Figure 12:
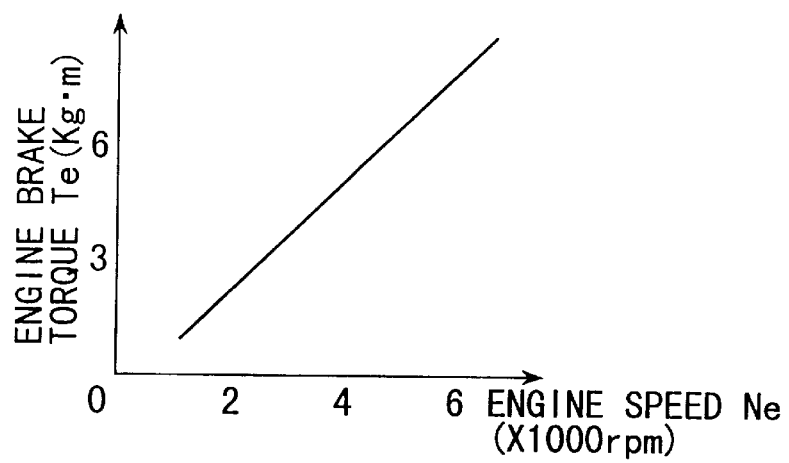
FIG. 12 is an explanatory diagram showing a relationship between engine speed and engine brake torque according to a fifth embodiment of the present invention.

Next, FIGS. 10 through 12 show a fifth embodiment of the present invention. FIG. 10 is a flowchart showing the differential limiting control, and FIG. 11 is a flowchart of the differential limiting force calculating routine. Further, FIG. 12 is an explanatory view showing the relationship between engine speed and engine brake torque. The feature of the fifth embodiment is to establish the reference brake fluid pressure such that the engine braking force is distributed between the front and rear wheels, at a distribution ratio corresponding to the front-to-rear weight distribution ratio. Other constructions and operations are identical to those of the fourth embodiment.

As shown in the flowchart of the differential limiting control in FIG. 10, when it is judged at S104 that no brake is applied or the brake fluid pressure $P_b$ is lower than the reference brake fluid pressure $P_s$, the program goes to S500 where the differential limiting force $S_c$ is calculated according to the differential limiting force calculating routine which will be described hereinafter.

After that, the program goes to S105 where the differential limiting force of the center differential 3 is established to be the $S_c$ which has been calculated at S500 and goes to S107. The processes after S107 are the same as those in the fourth embodiment.

Describing the differential limiting force calculating routine according to FIG. 11, first at S501 an engine speed $N_e$ is read from the engine control unit 60, and at S502 an engine brake torque $T_e$ on the turbine shaft is read, based on the engine speed $N_e$, from a map on which the relationship between the engine speed $N_e$ and the corresponding engine brake torque $T_e$, as shown in FIG. 12.

Next, the program goes to S503 where a gear ratio $I_m$ is read from the current gear position and, based on the gear ratio $I_m$, an engine braking force $B_e$ is estimated using the final gear ratio and the tire radius.

Then, the program goes to S504 where the differential limiting force $S_c$ is calculated according to the following formula:

$$S_c = (I_r - I_f) \cdot B_e \tag{6}$$

where $I_r$ is torque distribution ratio to rear wheel and $I_f$ is distribution ratio to front wheel.

For example, assuming a vehicle weight=1500 kg, a vehicle weight distributed to front wheel=900 kg, a vehicle weight distributed to rear wheel=600 kg, a front-to-rear torque distribution ratio $I_f / I_r$ of the center differential 3=0.4/0.6, then an irreducibly minimum differential limiting force $S_c$ is obtained so that the engine braking force $B_e$ is distributed between front and rear wheels corresponding to the front-to-rear weight distribution ratio.

First, when the differential limiting force is zero, i.e., when the differential limiting of the center differential 3 is released, the engine braking force $B_f$ on the front wheel side=$B_e \cdot I_f$=$0.4 \cdot B_e$ and the engine braking force $B_r$ on the rear wheel side=$B_e \cdot I_r$=$0.6 \cdot B_e$.

On the other hand, since the front-to-rear weight distribution ratio is 6:4 and a larger engine braking force is exerted to the rear wheel compared to the front wheel, the slip ratio of the rear wheel is larger than that of the front wheel. Therefore, the rotation of the rear wheel becomes smaller than that of the front wheel. In this state, when the differential limiting force is applied, a part of the braking force flows from the rear wheel side to the front wheel side.

Accordingly, in order to make an engine braking force distribution corresponding to the weight distribution ratio between front and rear wheels, the differential limiting force should be established so that the differential limiting force $S_c$ secures $0.2 \cdot B_e$ at a minimum. That is, the differential limiting force $S_c$ should be $0.2 \cdot B_e$. At this time, the engine braking force $B_f$ on the front wheel side is: $B_f$=$B_e \cdot I_f$+$S_c$=$0.6 \cdot B_e$ and the engine braking force $B_r$ on the rear wheel side is: $B_r$=$B_e \cdot I_r$-$S_c$=$0.4 \cdot B_e$.

In this way, according to the fifth embodiment of the present invention, since the engine braking force is correctly distributed between the front and rear wheels at a distribution ratio corresponding to the front-to-rear weight distribution ratio, it is possible to reduce the rotational difference between front and rear wheels so as not to cause a slip only on the front or rear wheel; thereby a stable under-steer characteristic can be maintained.

Figure 13:
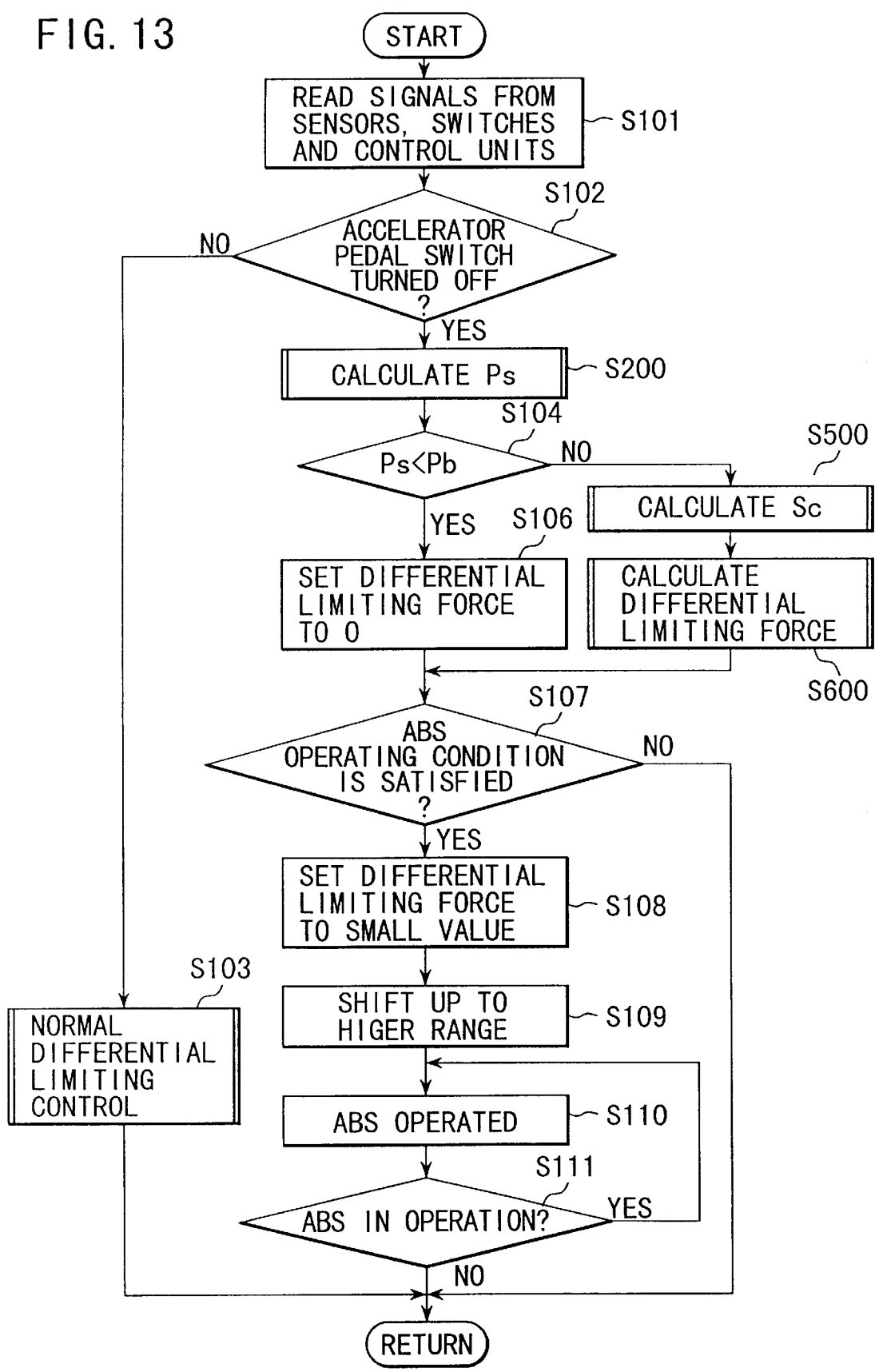
FIG. 13 is a flowchart of a differential limiting control according to a sixth embodiment of the present invention.
Figure 14:
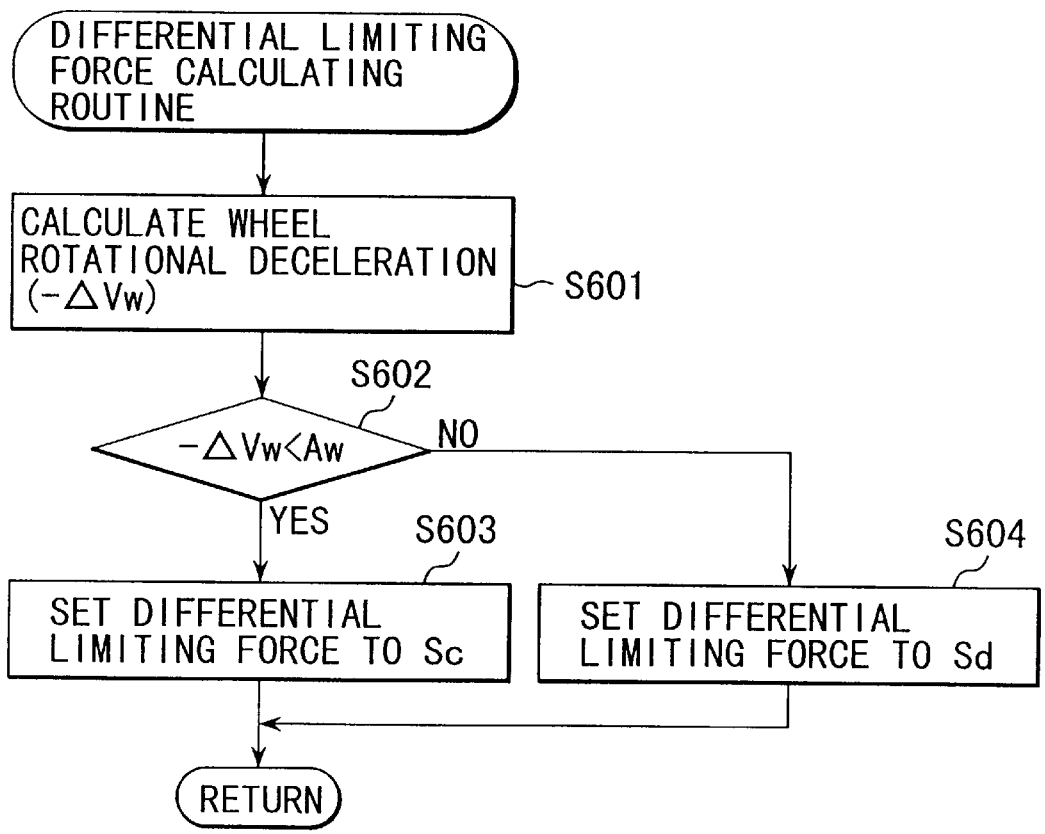
FIG. 14 is a flowchart of a routine for calculating a differential limiting force according to a sixth embodiment of the present invention.
Figure 15:
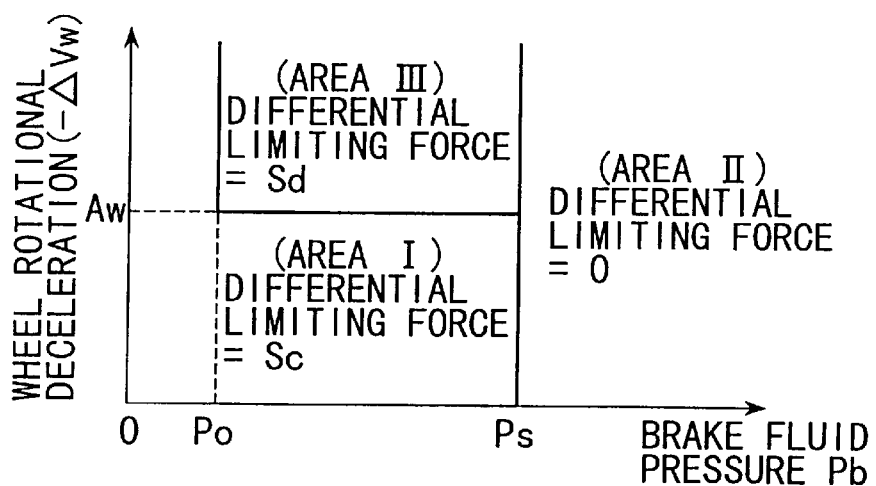
FIG. 15 is a diagram showing areas of differential limiting force in the relationship between brake fluid pressure and wheel deceleration according to a sixth embodiment of the present invention.

FIGS. 13 through 15 show a sixth embodiment of the present invention. FIG. 13 is a flowchart of the differential limiting control, and FIG. 14 is a flowchart of the differential limiting force calculating routine. Further, FIG. 15 is an explanatory view showing areas of the differential limiting force in relation to wheel rotational deceleration and brake fluid pressure. The feature of the sixth embodiment is to correct the differential limiting force so as to release the differential limiting if the wheel rotational deceleration is larger than a predetermined reference wheel rotational deceleration. Other constructions and operations are identical to those of the fifth embodiment.

Referring to FIG. 13, after the predetermined differential limiting force $S_c$ is calculated at S500, the program goes to S600 where the differential limiting force is subjected to the process by the differential limiting force calculating routine which will be described hereinafter. That is, the differential limiting force $S_c$ calculated at S500 is corrected to another value depending on the wheel rotational deceleration at S600.

Describing the differential limiting force calculating routine with reference to FIG. 14, first at S601 a wheel rotational deceleration ($-\Delta V_w$) is calculated, and then the program goes to S602 where the wheel rotational deceleration ($-\Delta V_w$) is compared with a predetermined reference wheel rotational deceleration $A_w$ (constant value, for example 1g).

If it is judged at S602 that the wheel rotational deceleration ($-\Delta V_w$) is smaller than the reference wheel rotational deceleration $A_w$ (in case of ($-\Delta V_w$)<$A_w$), the program goes to S603, wherein the differential limiting force of the center differential 3 is set to the value $S_c$ calculated at S500, and the program leaves the routine. On the other hand, the case where the wheel rotational deceleration ($-\Delta V_w$) is larger than the reference wheel rotational deceleration $A_w$ (in case of ($-\Delta V_w$)$\geq A_w$), the program goes to S604 where the differential limiting force of the center differential 3 is corrected to a value $S_d$ which is smaller than the $S_c$ ($0 \leq S_d \leq S_c$) and, the program leaves the routine.

That is, in the case where the brake fluid pressure $P_b$ is smaller than the reference brake fluid pressure $P_s$ with accelerator OFF and also the wheel rotational deceleration ($-\Delta V_w$) is larger than the reference wheel rotational deceleration $A_w$, the differential limiting force is corrected to a lower value than that already calculated, in order to detect the slip state more easily, and also in order to prevent the front or rear wheels from causing a slip abruptly. The differential limiting force is selected, as shown in FIG. 15, from respective areas in a map parameterizing the wheel rotational deceleration ($-\Delta V_w$) and the brake fluid pressure $P_b$.

The aforesaid differential limiting force $S_d$ may be a fixed value if the condition $0 \leq S_d \leq S_c$ is satisfied. Further, the $S_d$ may be $S_d$=$k \cdot S_c$ ($0 \leq k \leq 1.0$). Further, the $S_d$ may be established to be a value close to $S_c$ if the brake fluid pressure $P_b$ is close to the reference brake fluid pressure Ps and also if the wheel rotational deceleration ($-\Delta V_w$) is close to zero. Further, the $S_d$ may be established to be a value close to zero if the brake fluid pressure $P_b$ is close to the aforesaid $P_o$ and also if the wheel rotational deceleration ($-\Delta V_w$) is large.

Thus, according to the sixth embodiment of the present invention, since the differential limiting force is corrected in the direction of releasing the differential limiting if the wheel rotational deceleration is larger than the reference wheel rotational deceleration, the anti-lock brake control unit is surely operated under the condition that the wheel-locking is imminent even when the brake pedal is lightly depressed.

Figure 16:
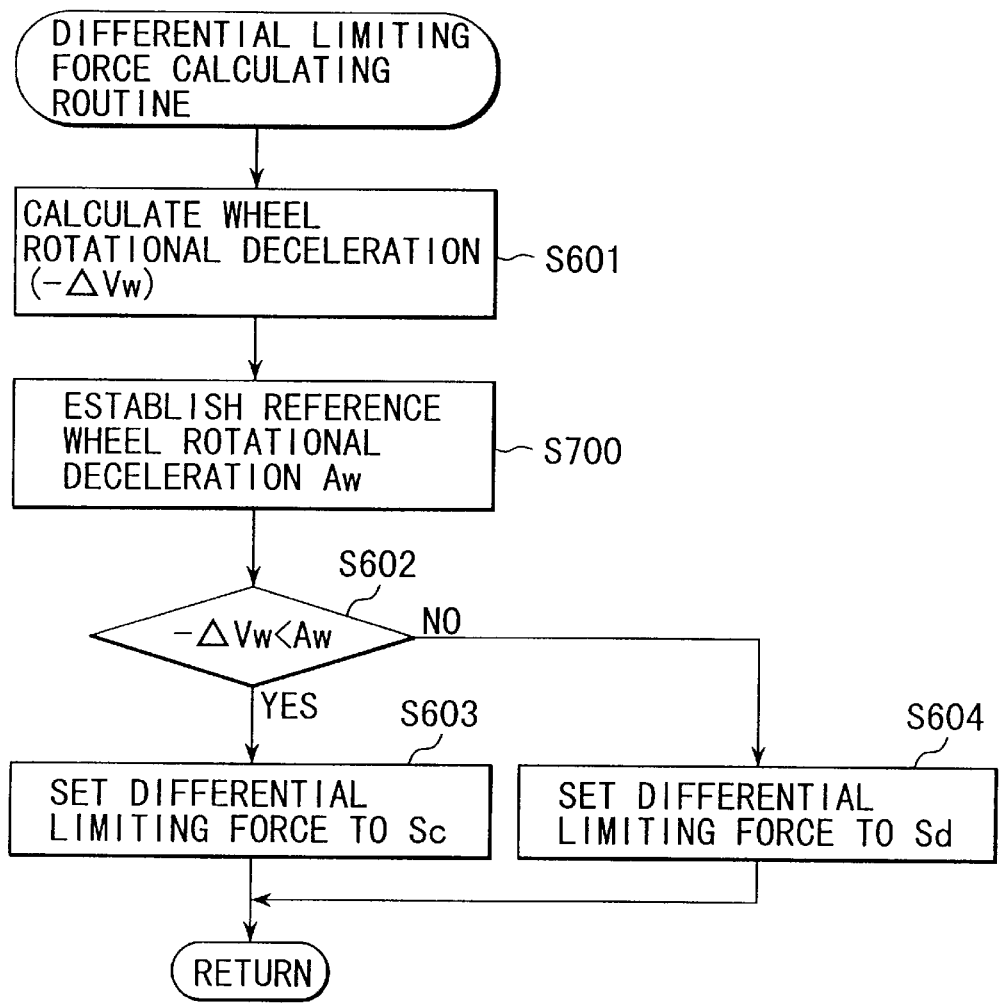
FIG. 16 is a flowchart of a routine for calculating a differential limiting force according to a seventh embodiment of the present invention.
Figure 17:
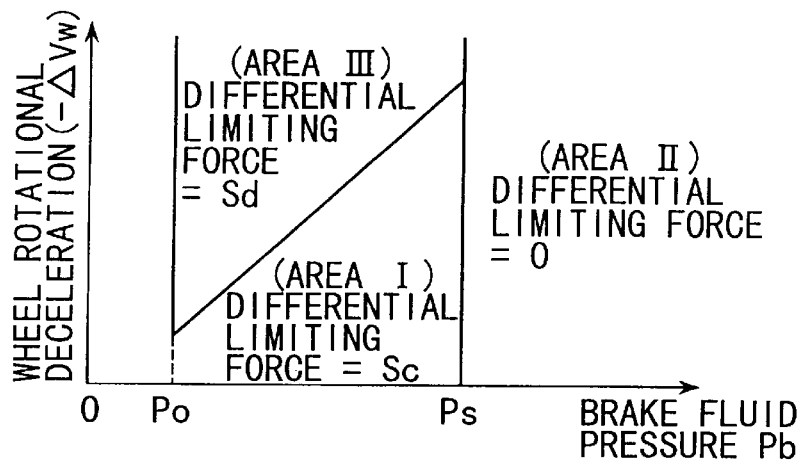
FIG. 17 is a diagram showing areas of differential limiting force in the relationship between brake fluid pressure and wheel deceleration according to a seventh embodiment of the present invention.
Figure 18:
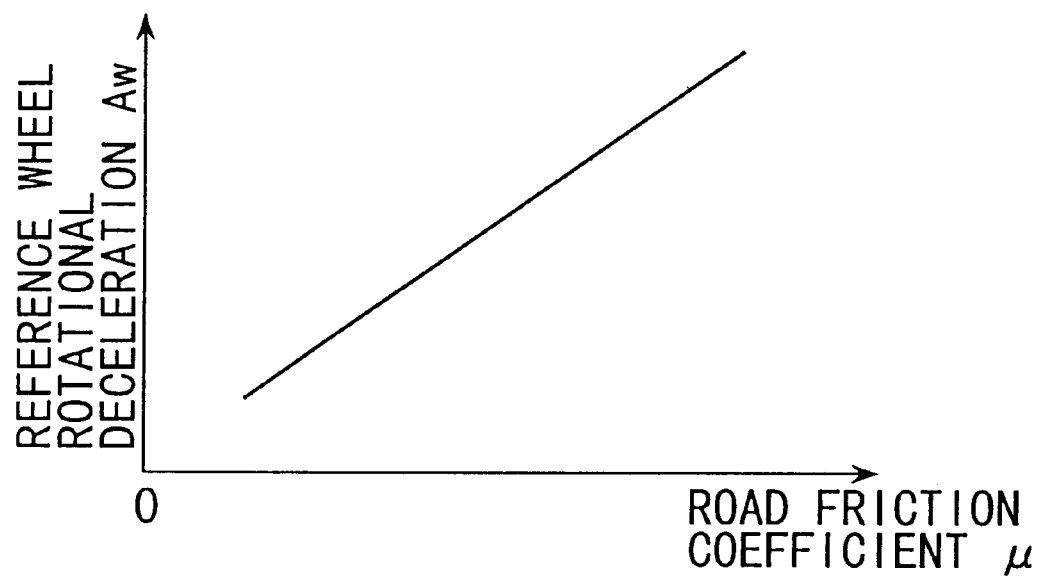
FIG. 18 is an example of a map for establishing a reference wheel deceleration corresponding to a road friction coefficient according to a seventh embodiment of the present invention.

FIGS. 16 through 18 show a seventh embodiment of the present invention. FIG. 16 is a flowchart of the differential limiting force calculating routine, and FIG. 17 is an explanatory view of areas of the differential limiting force in relation to the wheel rotational deceleration ($-\Delta V_w$) and the brake fluid pressure $P_b$. Further, FIG. 18 is a graph showing a relationship between the road friction coefficient $\mu$ and the reference wheel rotational deceleration $A_w$. The feature of the seventh embodiment is to vary the reference wheel rotational deceleration according to the brake fluid pressure. Other constructions and operations are identical to those of the sixth embodiment.

As shown in the flowchart of the differential limiting calculating routine in FIG. 16, at S601 a wheel rotational deceleration ($-\Delta V_w$) is calculated from wheel speed, and then at S700 a reference wheel deceleration $A_w$ is established. The reference wheel deceleration $A_w$ is not a fixed value like in the sixth embodiment. In the seventh embodiment, the reference wheel deceleration $A_w$ is established to be a low value when the brake fluid pressure $P_b$ is low, and established to be a high value when $P_b$ is high, as illustrated in FIG. 17. Therefore, the differential limiting force can take a small value like $S_d$, even when the brake fluid pressure $P_b$ is low and the wheel rotational deceleration ($-\Delta V_w$) is small. For example, when the vehicle travels on a road surface with low friction coefficient, the wheel lock easily occurs even with a light depression of the brake pedal. Under such conditions, according to this embodiment, since the differential limiting force is established to be a low value, the ABS operates effectively.

After that, the program goes to S602, where the wheel rotational deceleration ($-\Delta V_w$) is compared with the reference wheel rotational deceleration $A_w$ established at S700. In the same manner as in the sixth embodiment, in case of ($-\Delta V_w$)<$A_w$, the program steps to S603, where the differential limiting force of the center differential 3 is set to Sc, and the program leaves the routine. On the other hand, in the case of $(-\Delta V_w) \geq A_w$, the program steps to S604 where the differential limiting force of the center differential 3 is set to $S_d$ $(0 \leq S_d \leq S_c)$, and the program leaves the routine.

FIG. 18 shows a case where the reference wheel rotational deceleration $A_w$ established at S700 is determined according to the road friction coefficient $\mu$.

That is, generally the vehicle tends to cause a wheel lock when a light brake is applied on a road surface having low friction coefficient. The ABS operates under such conditions by establishing the reference wheel rotational deceleration to be a small value when the road friction coefficient is low.

In this way, according to the seventh embodiment of the present invention, since the reference wheel rotational deceleration is established according to brake fluid pressure or road friction coefficient, the state of the wheel lock can be detected more accurately.

In general, the vehicle has an excess under-steer or over-steer characteristic due to engine brake exerted only to front or rear wheels when it travels on a slippery road surface like snowy road, with accelerator off. Under this condition, to prevent this, the differential limiting between front and rear wheels is released to detect the slip condition on respective wheels independently and to operate the ABS effectively. Further, when an emergency braking is applied on a road surface with a high friction coefficient, the drive train of the vehicle can be prevented from causing a shock due to a sudden release of the engagement between front and rear wheels.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A differential limiting control apparatus for a four-wheel drive vehicle having a center differential for distributing torque from an engine to the wheels of the vehicle, the control apparatus comprising:

accelerator release detecting means for detecting whether an accelerator is released, braking force detecting means for detecting an amount of braking force applied to the wheels of the vehicle; and differential limiting force adjustment means for adjusting a differential limiting force of the center differential, wherein the differential limiting force adjustment means sets the differential limiting force to an initial differential limiting force reference value when the accelerator is released and the braking force is less than a braking force reference value, and wherein the differential limiting force adjustment means sets the differential limiting force to zero when the accelerator is released and the braking force is greater than the braking force reference value.

2. The differential limiting control apparatus according to claim 1, wherein the braking force reference value is a fixed value.

3. The differential limiting control apparatus according to claim 1, further comprising:

an anti-lock brake system which, when activated, prevents sustained wheel-lock by controlling the braking force, wherein, when the anti-lock brake control system is activated, the differential limiting force adjustment means adjusts the differential limiting force to an intermediate differential limiting force reference value which is less than the initial differential limiting force reference value but close to zero.

4. The differential limiting control apparatus according to claim 3, wherein the anti-lock brake system includes wheel deceleration detection means, and wherein the anti-lock brake system is activated when the deceleration of a wheel of the vehicle exceeds a specified deceleration value on braking.

5. The differential limiting control apparatus according to claim 4, further comprising:

means for adjusting a gear position into a higher range or a lower range, wherein the means for adjusting the gear position shifts the gear into the higher range, when the anti-lock brake system is activated and the differential limiting force is adjusted to the intermediate differential limiting force reference value.

6. The differential limiting control apparatus according to claim 1, wherein the braking force reference value is a calculated value, the apparatus further comprising:

means for estimating a road friction coefficient; and means for calculating the braking force reference value based on the estimated road friction coefficient.

7. The differential limiting control apparatus according to claim 6, further comprising:

an anti-lock brake system which, when activated, prevents sustained wheel-lock by controlling the braking force, wherein, when the anti-lock brake control system is activated, the differential limiting force adjustment means adjusts the differential limiting force to an intermediate differential limiting force reference value which is less than the initial differential limiting force reference value but close to zero.

8. The differential limiting control apparatus according to claim 7, wherein the anti-lock brake system includes wheel deceleration detection means, and wherein the anti-lock brake system is activated when the deceleration of a wheel of the vehicle exceeds a specified deceleration value on braking.

9. The differential limiting control apparatus according to claim 8, further comprising:

means for adjusting a gear position into a higher range or a lower range, wherein the means for adjusting the gear position shifts the gear into the higher range when the anti-lock brake system is activated and the differential limiting force is adjusted to the intermediate differential limiting force reference value.

10. The differential limiting control apparatus according to claim 6, wherein the means for calculating the braking force reference value calculates a preliminary value based on the estimated road friction coefficient and compares this preliminary value with a predetermined upper limit value for the braking force, and sets the braking force reference value equal to the predetermined upper limit value when the preliminary value is larger than the predetermined upper limit value.

11. The differential limiting control apparatus according to claim 1, wherein the braking force reference value is a calculated value, the apparatus further comprising:

means for calculating road inclination; and means for calculating the braking force reference value based on the calculated road inclination.

12. The differential limiting control apparatus according to claim 1, wherein the braking force reference value is a calculated value, the apparatus further comprising:
  means for detecting a lateral acceleration being applied to the vehicle; and
  means for calculating the braking force reference value based on the lateral acceleration being applied to the vehicle.

13. The differential limiting control apparatus according to claim 6, wherein the initial differential limiting force reference value is a calculated value, the apparatus further comprising:
  means for determining engine brake torque based on an engine speed;
  means for calculating engine braking force based on engine brake torque, a gear ratio at a current position, a final gear ratio and a tire radius; and
  means for calculating the initial differential limiting force reference value based on a distribution of engine braking force between front and rear wheels corresponding to a front-to-rear weight distribution.

14. The differential limiting control apparatus according to claim 13, further comprising:
  means for detecting wheel rotation speed; and
  means for calculating wheel speed deceleration rate,
  wherein the calculated initial differential limiting force reference value is corrected to a lesser value when the wheel deceleration rate is larger than a reference deceleration value.

15. The differential limiting control apparatus according to claim 14, wherein the reference deceleration value is calculated based on the braking force.

16. The differential limiting control apparatus according to claim 14, wherein the reference deceleration value is calculated based on the road friction coefficient.

17. A method of controlling a differential limiting force of a center differential of a four-wheel drive vehicle using the apparatus according to claim 1, the method comprising:
  detecting whether the accelerator is released;
  detecting the amount of braking force applied to the wheels of the vehicle; and
  determining whether the calculated braking force is greater than a braking force reference value, wherein,
    if the calculated braking force is less than the braking force reference value, setting the differential limiting force to an initial differential limiting force reference value, and,
    if the calculated braking force is greater than the braking force reference value, setting the differential limiting force to zero.

18. The method according to claim 17, wherein the braking force reference value is a fixed value.

19. The method according to claim 17, further comprising:
  preventing sustained wheel-lock by controlling the braking force with an anti-lock brake system; and
  when the anti-lock brake control system is activated, adjusting the differential limiting force to an intermediate differential limiting force reference value which is less than the initial differential limiting force reference value but close to zero.

20. The method according to claim 19,
  wherein the preventing sustained wheel-lock uses the anti-lock brake system which is activated when a deceleration of a wheel of the vehicle exceeds a specified deceleration value on braking.

21. The method according to claim 20, further comprising:
  adjusting a gear position into a higher range when the anti-lock brake system is activated and the differential limiting force is adjusted to the intermediate differential limiting force reference value.

22. The method according to claim 17, wherein the braking force reference value is a calculated value, the method further comprising:
  estimating a road friction coefficient; and
  calculating the braking force reference value based on the estimated road friction coefficient.

23. The method according to claim 22, the method further comprising:
  preventing sustained wheel-lock by controlling the braking force with an anti-lock brake system; and
  when the anti-lock brake control system is activated, adjusting the differential limiting force to an intermediate differential limiting force reference value which is less than, the initial differential limiting force reference value but greater than zero.

24. The method according to claim 23,
  wherein the preventing sustained wheel-lock uses the anti-lock brake system which is activated when a deceleration of a wheel of the vehicle exceeds a specified deceleration value on braking.

25. The method according to claim 24, further comprising:
  adjusting a gear position into a higher range when the anti-lock brake system is activated and the differential limiting force is adjusted to the intermediate differential limiting force reference value.

26. The method according to claim 22,
  wherein the calculating of the braking force reference value comprises calculating a preliminary value based on the estimated road friction coefficient and comparing this preliminary value with a predetermined upper limit value for the braking force, and setting the braking force reference value equal to the predetermined upper limit value when the preliminary value is larger than the predetermined upper limit value.

27. The method according to claim 17, wherein the braking force reference value is a calculated value, the method further comprising:
  calculating road inclination; and
  calculating the braking force reference value based on the calculated road inclination.

28. The method according to claim 17, wherein the braking force reference value is a calculated value, the method further comprising:
  detecting a lateral acceleration being applied to the vehicle; and
  calculating the braking force reference value based on the lateral acceleration being applied to the vehicle.

29. The method according to claim 21, wherein the initial differential limiting force reference value is a calculated value, the method further comprising:
  determining an engine brake torque based on the engine speed;
  calculating an engine braking force based on the engine brake torque, a current gear ratio, a final gear ratio and a tire radius; and
  calculating the initial differential limiting force reference value based on a distribution of engine braking force between front and rear wheels corresponding to a front-to-rear weight distribution.

30. The method according to claim 29, further comprising:
   detecting wheel rotation speed;
   calculating wheel speed deceleration rate; and
   correcting the calculated initial differential limiting force reference value to a lesser value if the wheel deceleration rate is larger than a reference deceleration value.

31. The method according to claim 30, wherein the reference deceleration value is calculated based on the braking force.

32. The method according to claim 30, wherein the reference deceleration value is calculated based on the road friction coefficient.

33. A method of controlling a differential limiting force of a four-wheel drive vehicle having a center differential for distributing torque from an engine to the wheels of the vehicle, the method comprising:
   detecting whether an accelerator of the vehicle is released;
   when the accelerator is released, calculating a braking force applied to the wheels; and
   determining whether the calculated braking force is greater than a braking force reference value, wherein,
      if the calculated braking force is less than the braking force reference value, setting the differential limiting force to an initial differential limiting force reference value, and,
      if the calculated braking force is greater than the braking force reference value, setting the differential limiting force to zero.

34. The method according to claim 33, wherein the braking force reference value is a fixed value.

35. The method according to claim 33, further comprising:
   preventing sustained wheel-lock by controlling the braking force using an anti-lock braking system; and
   when the anti-lock brake control system is activated to prevent sustained wheel-lock, adjusting the differential limiting force to an intermediate differential limiting force reference value which is less than the initial differential limiting force reference value but close to zero.

36. The method according to claim 35,
   wherein the anti-lock brake system includes wheel deceleration detection means, and wherein the anti-lock brake system is activated when the deceleration of a wheel of the vehicle exceeds a specified deceleration value on braking.

37. The method according to claim 36, further comprising:
   adjusting a gear position into a higher range when the anti-lock brake system is activated and the differential limiting force is adjusted to the intermediate differential limiting force reference value.

38. The method according to claim 33, wherein the braking force reference value is a calculated value, the method further comprising:
   estimating a road friction coefficient; and
   calculating the braking force reference value based on the estimated road friction coefficient.

39. The method according to claim 38, further comprising:
   preventing sustained wheel-lock by controlling the braking force using an anti-lock braking system; and
   when the anti-lock brake control system is activated to prevent sustained wheel-lock, adjusting the differential limiting force to an intermediate differential limiting force reference value which is less than the initial differential limiting force reference value but close to zero.

40. The method according to claim 39,
   wherein the anti-lock brake system includes wheel deceleration detection means, and
   wherein the anti-lock brake system is activated when a deceleration of a wheel of the vehicle exceeds a specified deceleration value on braking.

41. The method according to claim 40, further comprising:
   adjusting a gear position into a higher range when the anti-lock brake system is activated and the differential limiting force is adjusted to the intermediate differential limiting force reference value.

42. The method according to claim 38, wherein the calculating of the braking force reference value comprises:
   calculating a preliminary value based on the estimated road friction coefficient, and
   comparing the preliminary value with a predetermined upper limit value for the braking force; and
   setting the braking force reference value equal to the predetermined upper limit value when the preliminary value is larger than the predetermined upper limit value.

43. The method according to claim 33, wherein the braking force reference value is a calculated value, the method further comprising:
   calculating road inclination; and
   calculating the braking force reference value based on the road inclination calculation.

44. The method according to claim 33, wherein the braking force reference value is a calculated value, the method further comprising:
   detecting a lateral acceleration being applied to the vehicle; and
   calculating the braking force reference value based on the lateral acceleration being applied to the vehicle.

45. The method according to claim 33, wherein the initial differential limiting force reference value is a calculated value, the method further comprising:
   determining engine brake torque based on an engine speed;
   calculating engine braking force based on the engine brake torque, a current gear ratio, a final gear ratio and a tire radius;
   calculating the initial differential limiting force reference value based on a distribution of engine braking force between front and rear wheels corresponding to a front-to-rear weight distribution.

46. The method according to claim 44, further comprising:
   detecting wheel rotation speed;
   calculating wheel speed deceleration rate; and
   correcting the calculated initial differential limiting force reference value to a lesser value when the wheel deceleration rate is larger than a reference deceleration value.

47. The method according to claim 46, wherein the reference deceleration value is calculated based on the braking force.

48. The method according to claim 46 wherein the reference deceleration value is calculated based on the road friction coefficient.

* * * * *